United States Patent
Plank S. et al.

(10) Patent No.: US 10,725,633 B2
(45) Date of Patent: Jul. 28, 2020

(54) CHANGING THE LOCATION OF ONE OR MORE CURSORS AND/OR OUTPUTTING A SELECTION INDICATOR BETWEEN A PLURALITY OF CURSORS ON A DISPLAY AREA IN RESPONSE TO DETECTING ONE OR MORE TOUCH EVENTS

(71) Applicant: Thumba Inc., San Francisco, CA (US)

(72) Inventors: Andras Plank S., Walnut Creek, CA (US); Gabor A. Rab, Budapest (HU); Felician Benda, Budapest (HU)

(73) Assignee: THUMBA, Inc., San Francisco, CA (US)

( * ) Notice: Subject to any disclaimer, the term of this patent is extended or adjusted under 35 U.S.C. 154(b) by 0 days.

(21) Appl. No.: 16/030,724

(22) Filed: Jul. 9, 2018

(65) Prior Publication Data
US 2019/0018576 A1    Jan. 17, 2019

Related U.S. Application Data

(60) Provisional application No. 62/530,849, filed on Jul. 11, 2017.

(51) Int. Cl.
*G06F 3/0484*  (2013.01)
*G06F 3/0488*  (2013.01)
*G06F 3/0489*  (2013.01)

(52) U.S. Cl.
CPC ...... *G06F 3/04842* (2013.01); *G06F 3/04883* (2013.01); *G06F 3/04886* (2013.01); *G06F 3/04895* (2013.01)

(58) Field of Classification Search
CPC ............. G06F 3/04883; G06F 3/04886; G06F 3/04895; G06F 3/04842
See application file for complete search history.

(56) References Cited

U.S. PATENT DOCUMENTS 8,650,507 B2 *  2/2014  Westerman ......... G06F 3/04883
                                                           715/863
9,354,805 B2 *  5/2016  Thorsander ........... G06F 3/0488
(Continued)

FOREIGN PATENT DOCUMENTS

HU          P1100505 A2    4/2013

OTHER PUBLICATIONS

Wikipedia, "T9 (predictive text)" Wikipedia, Apr. 2018, 3 pages retrieved from https://en.wikipedia.org/wiki/T9_(predictive_text).

*Primary Examiner* — Lixi C Simpson
(74) *Attorney, Agent, or Firm* — Fish & Richardson P.C.

(57) ABSTRACT

A method according to one embodiment includes detecting a first touch event on a touch-sensitive input area of a device, determining that the first touch event corresponds to a command to anchor a first cursor at a current location of the first cursor on a display area coupled to the touch-sensitive input area, anchoring the first cursor at the current location thereof on the display area in response to determining that the first touch event corresponds to the command to anchor the first cursor, detecting a second touch event, outputting a second cursor on the display area, changing the output location of the second cursor in response to detecting that a detected touch of the second touch event departs from a starting location of the second touch event, and outputting a selection indicator on a portion of the display area between the first cursor and second cursor.

20 Claims, 5 Drawing Sheets

(56) References Cited

U.S. PATENT DOCUMENTS

| | | | |
|---|---|---|---|
| 9,400,567 B2* | 7/2016 | Weir | G06F 3/033 |
| 10,019,425 B2* | 7/2018 | Hui | G06F 3/04842 |
| 2010/0171713 A1* | 7/2010 | Kwok | G06F 3/0488 |
| | | | 345/173 |
| 2014/0082546 A1* | 3/2014 | Yang | G06F 3/0216 |
| | | | 715/773 |
| 2014/0109016 A1* | 4/2014 | Ouyang | G06F 17/24 |
| | | | 715/856 |
| 2014/0340319 A1* | 11/2014 | Fenton | G06F 3/041 |
| | | | 345/173 |
| 2017/0010791 A1* | 1/2017 | Sakamoto | G06F 3/04842 |

* cited by examiner

CHANGING THE LOCATION OF ONE OR MORE CURSORS AND/OR OUTPUTTING A SELECTION INDICATOR BETWEEN A PLURALITY OF CURSORS ON A DISPLAY AREA IN RESPONSE TO DETECTING ONE OR MORE TOUCH EVENTS

RELATED APPLICATIONS

This application claims priority to U.S. Provisional Patent Appl. No. 62/530,849, filed on Jul. 11, 2017 and entitled "Selecting of text using gestures on a touch interface" which is herein incorporated by reference.

FIELD OF THE INVENTION

The present invention relates to visual display systems, and more particularly, this invention relates to interactive touch-based devices.

BACKGROUND

Currently, touch-based input methods, such as touchscreen keyboards typically used on touchscreen devices, are widely utilized. These virtual keyboards are usually oriented in accordance with a "QWERTY" keyboard layout (or its variations) consisting of dozens of small virtual keys spread usually uniformly across a particular displayed keyboard.

These virtual keyboard implementations however often provide only limited typing comfort. For example, when holding a device displaying such a keyboard, some keys typically reside out of reach of a user's fingers, and therefore a user is forced to frequently adjust handling orientations of the device in order to utilize the keyboard, which results in reduced typing speeds. Moreover, a user may unintentionally drop the device displaying the virtual keyboard while adjusting handling orientation of the device, which may result in significant damage and/or loss of functionality of the device.

Moreover, because virtual keys of conventional virtual keyboards are often small in size (such as to fit each of the 26 letters of the English alphabet on different keys) relative to the average human thumb (which is often used to select virtual keys), typing and display selection accuracy is often compromised on such keyboards.

Additionally, because text displayed on a conventional display is often condensed closely together, it is often difficult for users to locate and change the location of a cursor on devices. This is because users may find it difficult to select, on smaller displays, the exact location to which a cursor is to be moved to. This is time consuming, and can cause interference with a user's cognitive processes.

Furthermore, while using conventional virtual keyboards on a conventional device, selection of text and/or cursor location adjustment often requires a user to adjust their handling orientation of the device, e.g., for example to reach locations on a device display that reside out of reach of a user's fingers. This can also be time consuming, and moreover may result in damage to the device where such adjusted handling results in the user unintentionally dropping the device.

Even further, conventional methods of selecting text do not allow users to modify a starting location of a selected area of text, once the text selection has been made, e.g., using a computer mouse. Instead, in order to redefine a text selection, users are forced to re-define the entire sections, which is time consuming.

SUMMARY

A method according to one embodiment includes detecting a first touch event on a touch-sensitive input area of a device, determining that the first touch event corresponds to a command to anchor a first cursor at a current location of the first cursor on a display area coupled to the touch-sensitive input area, at least temporarily anchoring the first cursor at the current location thereof on the display area in response to determining that the first touch event corresponds to the command to anchor the first cursor, detecting a second touch event on a different portion of the touch-sensitive input area of the device, outputting a second cursor on the display area at the same location as the first cursor, changing the output location of the second cursor on the display area in response to detecting that a detected touch of the second touch event departs from a starting location of the second touch event, and outputting a selection indicator on a portion of the display area between the first cursor and the second cursor.

A computer program product according to one embodiment includes a computer readable storage medium having stored thereon computer readable program instructions configured to cause a processor of a computer system to perform the foregoing method.

Other aspects and advantages of the present invention will become apparent from the following detailed description, which, when taken in conjunction with the drawings, illustrate by way of example the principles of the invention.

DETAILED DESCRIPTION

Figure 1:
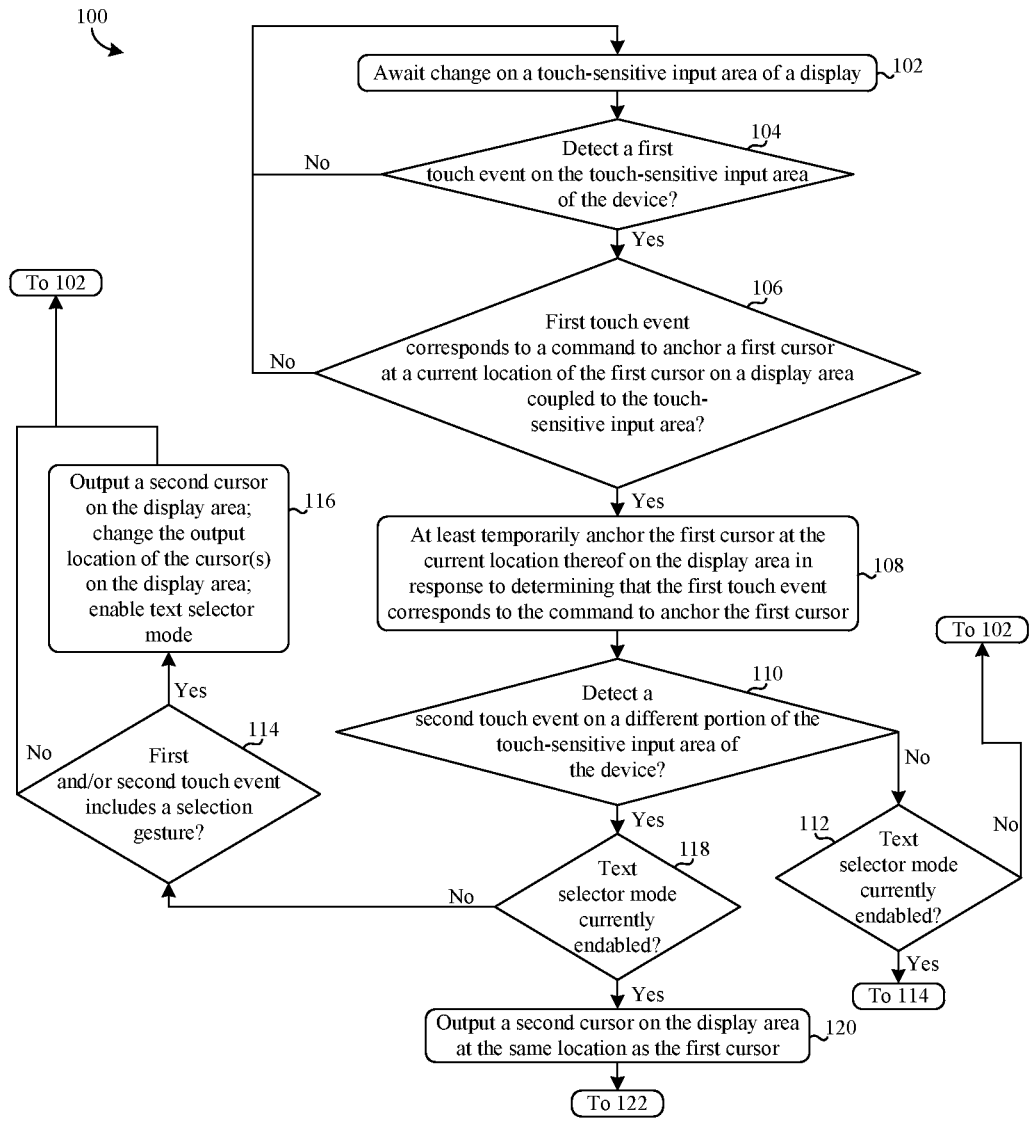
FIG. 1 is a flowchart of a method, in accordance with one embodiment.
Figure 1:
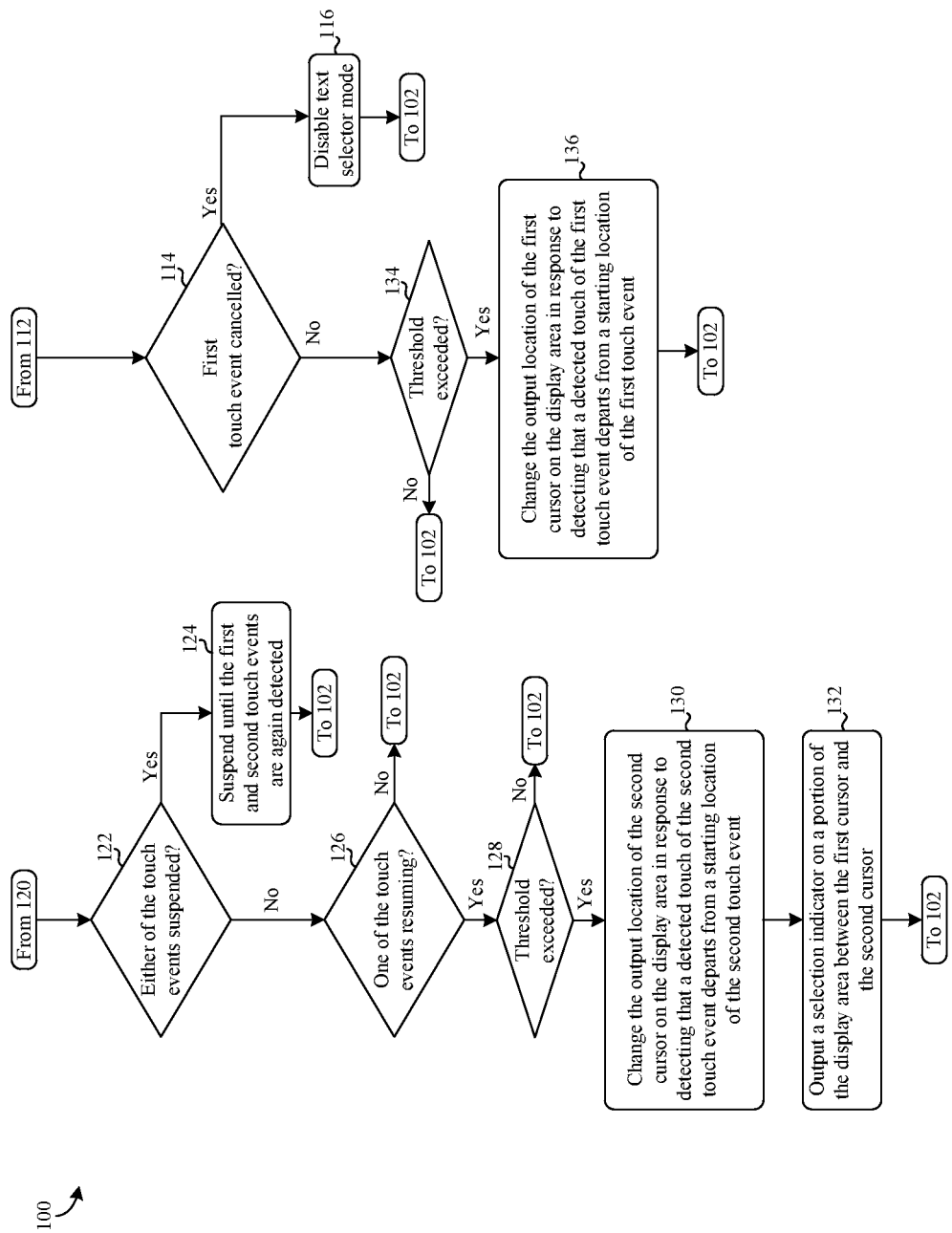

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of gesture based cursor adjustment and/or selection of an area of a display and/or related systems and methods.

In one general embodiment, a method includes detecting a first touch event on a touch-sensitive input area of a device, determining that the first touch event corresponds to a command to anchor a first cursor at a current location of the first cursor on a display area coupled to the touch-sensitive input area, at least temporarily anchoring the first cursor at the current location thereof on the display area in response to determining that the first touch event corresponds to the command to anchor the first cursor, detecting a second touch event on a different portion of the touch-sensitive input area of the device, outputting a second cursor on the display area at the same location as the first cursor, changing the output location of the second cursor on the display area in response to detecting that a detected touch of the second touch event departs from a starting location of the second touch event, and outputting a selection indicator on a portion of the display area between the first cursor and the second cursor.

In another general embodiment, a computer program product includes a computer readable storage medium having stored thereon computer readable program instructions configured to cause a processor of a computer system to perform the foregoing method.

Conventional keyboards, and particularly conventional virtual keyboards, commonly implement a standard "QWERTY" keyboard layout (or its variations) configured for typing thereon. For a user, these keyboards are often difficult to type on and, more broadly, deliver creating and manipulating texts. This is because each of the characters of such keyboards are often designated to a different key of the keyboard, which together constitute a vast plurality of spaced keys.

Accordingly, such conventional virtual keyboard implementations often provide only limited typing comfort. Moreover, users are prone to dropping the device displaying such conventional keyboards, such as while standing and typing on a device displaying the conventional virtual keyboard, as a result of having to adjust the handling orientation of the device while typing to reach such keys. This can be very expensive, as dropping such devices often results in significant damage and/or loss of functionality of the device being typed on. Learning how to type on such conventional keyboards is also no easy task, and often takes months if not years to develop proficiency at.

Yet furthermore, in order to adjust positioning/location of a cursor of the device and/or in order to select a portion of text on a display of the device, users often have to reposition their handhold of the device. This can be time consuming, and moreover, may result in damage to the device where such repositioned handling results in the user unintentionally dropping the device. Moreover, in order to adjust the positioning of a cursor on a device, users often have to strain in stretching their fingers to reach a display portion of the device at which the cursor is to be repositioned. This is also distracting and inefficient in the context of a user using such a device.

Various embodiments and approaches described herein include updating the location of at least one cursor and/or outputting a selection indicator on a portion of a display between a first and second cursor, in response to detecting at least one touch event on a touch-sensitive input area of a device.

FIG. 1 shows a method 100 for updating the location of one or more cursors and/or outputting a selection indicator on a portion of a display between a first and second cursor on a display area, in accordance with one embodiment. As an option, the present method 100 may be implemented to devices such as those shown in the other FIGS. described herein. Of course, however, such method 100 and others presented herein may be used for facilitating efficient text input on a device which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

It should be noted that various operations and/or decisions of method 100 may be described herein to be performed on any type of device. In a more specific approach, such various operations and/or decisions of method 100 may be described herein to be performed on a display, e.g., such as a display of a device. According to various approaches, the display may be any known type of display. For example, the display may preferably be a touch-sensitive display. Various examples of such devices and/or displays will be described in other various approaches and/or embodiments described elsewhere herein, e.g., see FIGS. 2-4.

It should be prefaced however, that in various approaches, method 100 may be implemented on a computer system having one or more processors operatively coupled to a memory component with at least one electronic visual display that is configured for displaying text and/or editing text, referred to collectively herein as a computer, and is connected to via wireless or wired connection, or incorporates, a touch-sensitive input interface that embodies a plurality of virtual ambiguous keys, that can be utilized for, e.g., inputting text to the computer, updating the location of at least one cursor on a display area, outputting a selection indicator on a portion of a display between a first and second cursor on a display area, etc., as will be described in greater detail elsewhere herein. In some approaches, the computer can be a wired communication device (for example, a laptop computer having a touch screen); a mobile or handheld wireless communication devices such as cellular phones, smartphones, wireless organizers, personal digital assistants, wirelessly enabled notebook, tablets and similar devices; a computer with or without wireless communication capabilities, such as a handheld electronic game device, game controller, digital photograph album, digital camera; or any other device.

Operation 102 of method 100 includes awaiting change on a touch-sensitive input area of a display. For descriptive purposes, a change on a touch-sensitive input area of a display may include receiving (on the touch-sensitive input area of a display) any type of input. For example, in one approach, a received input may include a touch event. In various more specific approaches, a touch event may be initiated in response to detecting that an object, e.g., a surface of a user's finger, a plastic tipped stylus, an electronic device, etc., coming into contact with a touch-sensitive input area of a display.

Accordingly, method 100 includes determining whether a touch event has been detected on the touch-sensitive input area of a display, e.g., see decision 104.

In response to not detecting a touch event on the touch-sensitive input area of the display (e.g., as illustrated by the "No" logical path of decision 104) operations 102 and/or 104 may be performed, e.g., waiting for a change to occur such as a first touch event being detected.

In contrast, in response to detecting a touch event on the touch-sensitive input area of the display (e.g., as illustrated by the "Yes" logical path of decision 104), it may be determined whether the first touch event corresponds to a command to anchor a first cursor at a current location of the first cursor on a display area coupled to the touch-sensitive input area, e.g., see decision 106.

As will be described in greater detail elsewhere herein, the coupling between the display area and the touch-sensitive input area may be any type of coupling. Accordingly, the display may or may not also include the touch-sensitive input area. For example, in one approach, the coupling between the display area and the touch-sensitive input area may be established by the display area and the touch-sensitive input area being on the same device, e.g., see FIG. 2. According to another approach, the coupling between the display area and the touch-sensitive input area may be established by the display area and the touch-sensitive input area being wirelessly connected, e.g., see FIG. 3. Such approaches and concepts will be will described elsewhere herein and will become apparent to one skilled in the art upon reading the present descriptions.

In response to determining that the first touch event does not correspond to the command to anchor the first cursor (e.g., as illustrated by the "No" logical path of decision 106), in various approaches, operations 102 and/or 104 may be performed, e.g., waiting for a change to occur such as a first touch event being detected. In such approaches, the immediately previously detected first touch event may be disregarded as a miscellaneous touch event, e.g., a touch event that originated from an accidental touch being made on the touch-sensitive input area.

In one approach, in response to determining that the first touch event corresponds to the command to anchor the first cursor (e.g., as illustrated by the "Yes" logical path of decision 106), the first cursor may be at least temporarily anchored at the current location thereof on the display area, e.g., see operation 108.

Decision 110 of method 100 includes determining whether a second touch event has been detected on a different portion of the touch-sensitive input area of the device (different than a portion of the touch-sensitive input area of the device at which the first touch event was detected).

In various approaches, method 100 may include waiting any amount of time for a second touch event to be detected. In a more specific approach, method 100 may include waiting only a predetermined amount of time for a second touch event to be detected, e.g., one second, one minute, one hour, etc.

In one approach, in response to determining that a second touch event has not been detected on a different portion of the touch-sensitive input area of the device, e.g., within a predetermined amount of time, method 100 may include determining whether a text selector mode is currently enabled, e.g., see decision 112.

According to various approaches, the enabling and/or disabling of modes, e.g., such as a text selection mode, may be utilized for streamlining input on the touch-sensitive input for a user and/or adjustment of one or more cursors on the display area. For example, according to one approach, while a text selector mode is not enabled, touch events that otherwise might lead to cursor adjustment on the display area may not do so, e.g., see "No" logical path of decision 112 returning to operation 102. In contrast, while a text selector mode is enabled, touch events may correspond to streamlined, e.g., changing of one or more cursor locations on the display area, selection of text/area between a plurality of cursors on the display area, etc., as will become apparent to one skilled in the art upon reading of the descriptions herein.

In response to determining that the text selector mode is enabled (e.g., as illustrated by the "Yes" logical path of decision 112), it may be determined whether the first touch event was cancelled, e.g., see decision 114. It should be noted that decision 114 may be an optional decision. For example, in some approaches, decision 114 may be performed in response to the first touch event no longer being detected, which may not occur during an iteration of method 100. In some other approaches, the decision 114 may be determined in response to determining that the text selector mode is currently enabled.

Moreover, according to various approaches, the first touch even being "cancelled" may refer to the first touch event no longer being detected subsequent the first touch event being detected. In one approach, a loss of detection of the first touch event may result from a user and/or touch device (that initiated the detected first touch event) at least temporarily breaking contact with the touch-sensitive input area of the device. Accordingly, in response to determining that the first touch event has been cancelled (e.g., as illustrated by the "Yes" logical path of decision 114), the text selector mode may be disabled, e.g., see operation 116.

At any time after the first touch event is detected, the location of the first cursor on the display area may be changed, depending on the approach. For example, in some approaches, method 100 may include determining whether the touch event departs from a starting location of the first touch event. In other words, it may be detected that the first touch remains fixed in place for the entire duration that the first touch is detected, and/or it may be detecting that a detected touch of the first touch event departs from a starting location of the first touch event, e.g., departs from the location on the touch-sensitive input area of the device at which the first touch event was initially detected. Accordingly, in some approaches, the first touch event may include a gesture with a starting location and an ending location.

In some approaches, the output location of the first cursor on the display area may be changed in response to the first touch event including a gesture. In one approach however, the output location of the first cursor on the display area may only be changed in response to the first touch event including a gesture, where the distance between a starting location and an ending location of the gesture on the touch-sensitive input area is determined to be greater or greater than or equal to a predetermined threshold, e.g., see decision 134. Applying a predetermined threshold to a gesture may ensure that accidental touch events that are detected on the touch-sensitive input area, do not result in an unintentional changing of the output location of the first cursor on the display area. Accordingly, in some approaches, to visually assist a user associated with a first touch event, method 100 may optionally include outputting a touch event border that surrounds the location of the detected first touch event. The touch event border may indicate a threshold boundary, which after trespassing thereacross, a detected touch event may be determined to be a gesture, e.g., where the touch even includes a gesture if it is determined that the threshold boundary is trespassed after the touch event departs from the starting location of the first touch event.

Accordingly, in response to detecting that a detected touch of the first touch event departs from a starting location of the first touch event, e.g., exceeding a predetermined threshold boundary, the output location of the first cursor on the display area may be changed, e.g., see operation 136.

A degree that the output location of the first cursor changes on the display area may be at least based on any one or more variables. For example, in one approach, the degree that the output location of the first cursor changes on the display area may at least in part be based on a time that it is detected to take to traverse from the starting location to the ending location of the gesture. In such an approach, the quicker (in time) that the traversal is from the starting location to the ending location of the gesture of the first touch event, the greater the degree that the output location of the first cursor may be changed. It should be noted that the term "quicker" may be evaluated with respect to and/or using, e.g., time(s) that it was previously detected to take to traverse from a starting location to an ending location of one or more other gestures, a predetermined reference time that corresponds to the distance between the starting location and the ending location of the gesture, etc., relative to the time that it is detected to take to traverse from the starting location to the ending location of the gesture of the first touch event.

Accordingly, a first touch event may be used by a user to traverse the first cursor to different locations on the display area, without the user having to touch the display area and/or use an additional device such as a mouse to change the location of the first cursor. This benefit and similar benefits will become even more apparent to one skilled in the art upon reading the further descriptions of method 100 and/or other examples such as FIGS. 2-4.

Now following the "Yes" logical path of decision 110, method 100 may include detecting a second touch event on a different portion of the touch-sensitive input area of the device, e.g., different than the portion of the touch-sensitive input area of the device that the first touch event was detected at.

In one approach, the second touch event may include a gesture with a starting location and an ending location.

In some approaches, similar to decision 112, it may be determined whether a text selector mode is currently enabled, e.g., see decision 118.

In response to determining that the text selector mode is currently enabled (e.g., as illustrated by the "Yes" logical path of decision 118) operation 120 includes outputting a second cursor on the display area at the same location as the first cursor. In other approaches, the second cursor may be output on the display area at a different location as the first cursor. It should be noted that operation 120 may be performed despite the outcome of the decision 118. For example, operation 120 may be performed in response to detecting the second touch event.

According to various approaches, when output on the display area at the same location as the first cursor, the second cursor and the first cursor may be each distinguishably visible to a user looking at the display area. In more specific approaches, e.g., the first cursor may be a different color than the second cursor, the first cursor may have a different line thickness than the second cursor, the first cursor may be a different shape than the second cursor, etc.

At any time, method 100 may include determining whether either of the touch events become suspended, e.g., see decision 122. In one approach, a touch event may be determined to be suspended in response to at least temporarily no longer detecting the touch event. For example, assume that a first touch event is detected after a user contacts a touch-sensitive input area of a device. Moreover, assume that the user subsequently stops contacting the touch-sensitive input area of the device. Because the user may have only temporarily retracted contact of the touch-sensitive input area of a device, method 100 may include suspending further operations until the first and second touch events are again detected, e.g., see operation 124 continuing to operation 102.

According to one approach, method 100 may include determining whether the first touch event or the second touch event are not detected at some time after the first touch event and the second touch event are detected. Accordingly, decision 126 includes determining if one of the touch events, e.g., a touch event that was for some duration of time no longer detected after being previously detected, is again detected, e.g., "resuming". Accordingly, both the first touch event and the second touch event may be detected in order to resume the touch event.

It should be noted that there are a number of user actions that may lead to a loss of detection of the first touch event and/or the second touch event. For example, assume that a user is holding the device and a detected first touch event and a detected second touch event correspond to a user's thumbs contacting the touch-sensitive input area of the device. A loss of detection of one of the detected touch events may stem from the user at least temporarily breaking thumb contact with the touch-sensitive input area of the device while reaching for a cup of coffee, while the remaining touch event may remain detected as the user continues to hold the device and contact the touch-sensitive input area of the device with the user's other hand. Accordingly, a resuming of detection of both the first touch event and the second touch event may occur upon the user again contacting the touch-sensitive input area at two different portion of the touch-sensitive input area of the device.

In another approach, in the context of gestures described elsewhere herein, a loss of detection may result from a user performing a series of swipe gestures, e.g., for changing the output location of the associated cursor a series of times which may be displayed as a rolling traversal of the cursor. Accordingly, according to various approaches, the first and/or the second touch events may include a series of similar gestures. In any of such approaches, a suspending and subsequent resuming may occur after each gesture ends, however, in one approach during one or more of such suspending events, the output location of the cursor may continue to be changed.

Operation 130 of method 100 includes changing the output location of the second cursor on the display area in response to detecting that a detected touch of the second touch event departs from a starting location of the second touch event.

Accordingly, in one approach detecting the second touch event may include determining an ending location of a gesture extending between the starting location and the ending location. Such a determination may be used in any one or more other considerations.

For example, in one approach, with the ending location of the gesture extending between the starting location and the ending location determined, it may be determined whether or not a distance between the starting location and the ending location of the gesture is greater or greater than or equal to a predetermined threshold, e.g., see decision 128. Similar to as described elsewhere herein, e.g., see decision 134, applying a predetermined threshold to a gesture may ensure that accidental touch events that are detected on the touch-sensitive input area, do not result in an unintentional changing of the output location of the second cursor on the display area. Accordingly, in some approaches, to visually assist a user associated with a second touch event, method 100 may optionally include outputting a touch event border that surrounds the location of the detected second touch event. The touch event border may indicate a threshold boundary, e.g., see FIG. 2, which after trespassing thereacross, a detected touch event may be determined to be a gesture, e.g., where the touch even includes a gesture if it is determined that the threshold boundary is trespassed after the touch event departs from the starting location of the first touch event.

According to another approach, determining the ending location of the gesture extending between the starting location and the ending location may thereafter be used in determining where the output location of the second cursor should be changed to on the display area. For example, a degree that the output location of the second cursor changes on the display area may be based at least in part on a time that it is detected to take to traverse from the starting location to the ending location of the gesture. In such an approach, the quicker (in time) that the traversal is from the starting location to the ending location of the gesture of the second touch event, the greater the degree that the output location of the second cursor may be changed. It should be noted that the term "quicker" may be evaluated with respect to and/or using, e.g., time(s) that it was previously detected to take to traverse from a starting location to an ending location of one or more other gestures, a predetermined reference time that corresponds to the distance between the starting location and the ending location of the gesture, etc., relative to the time that it is detected to take to traverse from the starting location to the ending location of the gesture of the second touch event.

It should be noted that the location of a cursor may be changed relative to any one or more, e.g., predetermined sizes of the display area and/or text that may be output on the display area. For example, the location of a cursor may be changed, e.g., relative to words on the display area, relative to or more lines of text on the display area, relative to a paragraph of text on the display area, relative to a sentence on the display area, relative a predetermined amount of the display area, etc. In one specific approach, the time that it is detected to take to traverse from the starting location to the ending location of the gesture may correlate to a predetermined scalar of the amount that the location of the cursor is changed.

Operation 132 of method 100 includes outputting a selection indicator on a portion of the display area between the first cursor and the second cursor. The selection indicator may include any visual indicator that indicates a portion of the display that corresponds to the first and second touch events. For example, in one approach, the selection indicator may include a highlighting along a line of text that the first cursor and/or the second cursor reside on. In another approach, the selection indicator may additionally and/or alternatively include a highlighting along a line of text that the first cursor and the second cursor do not reside on. In another approach, the selection indicator may include an underlining along a line of text and/or portion of the display area. In yet further approaches, the selection indicator may include, e.g., a bolding of text within the portion of the display area between the first cursor and the second cursor, an italicizing of text within the portion of the display area between the first cursor and the second cursor, a changing the color of text within the portion of the display area between the first cursor and the second cursor, etc.

With reference again to decision 118, in response to determining that the text selector mode is not currently enabled (e.g., as illustrated by the "No" logical path of decision 118), it may be determined whether the first and/or the second touch event includes a selection gesture, e.g., see decision 114. In one approach, a touch event may be determined to include a selection gesture in response to detecting that a detected touch of the at least one of the touch event departs from a starting location of the at least one touch event.

Moreover, in response to determining that the first and or the second touch event includes a selection gesture (e.g., as illustrated by the "Yes" logical path of decision 114), operation 116 may include at least one of: outputting a second cursor on the display area, changing the output location of the cursor(s) on the display area, and enabling the text selector mode. It should be noted that in one approach, if the text selector mode is enabled, e.g., by performing operation 116, a subsequent performing of method 100 may reflect such a mode being enabled, e.g., see logic of operation 116 return to operation 102.

As previously mentioned, performing one or more operations and/or decisions of method 100, may be utilized for streamlining selective control of a display area. In conventional computer systems and/or devices, while a user types on a conventional keyboard, the user frequently has to change hand placement and/or break from typing stance to adjust a cursor placement on a display or select text on a display. For example, while using a computer, users often have to reach for a computer mouse or adjust their hand placement on a device to physically tap a display in order to change cursor locations on a display. In sharp contrast, utilizing method 100, a user is able to adjust cursor placement on a display and/or select text on a display, using streamlined touch events. Accordingly, there are numerous benefits to utilizing method 100. For example, a user will experience improved speeds and proficiencies when using a device utilizing method 100, e.g., when typing text or viewing a document displayed on the device. This is because the user will not have to break typing stance in order to adjust a cursor placement on a display or select text on a display. Such proficiencies will also result in a preservation of battery of the device, e.g., in the time that is saved in not having to reach to adjust a cursor placement on a display or select text on a display, and enable quicker and easier completion of tasks than conventional devices offer. Such benefits, as well as additional other benefits provided as a result of implementing method 100 will now be described below. In particular, it may be noted that many of such benefits are provided as a result of implementing various operations and/or decisions of method 100 on a device configured for circumferential gestures, e.g., as will now be described in FIG. 2.

Figure 2:
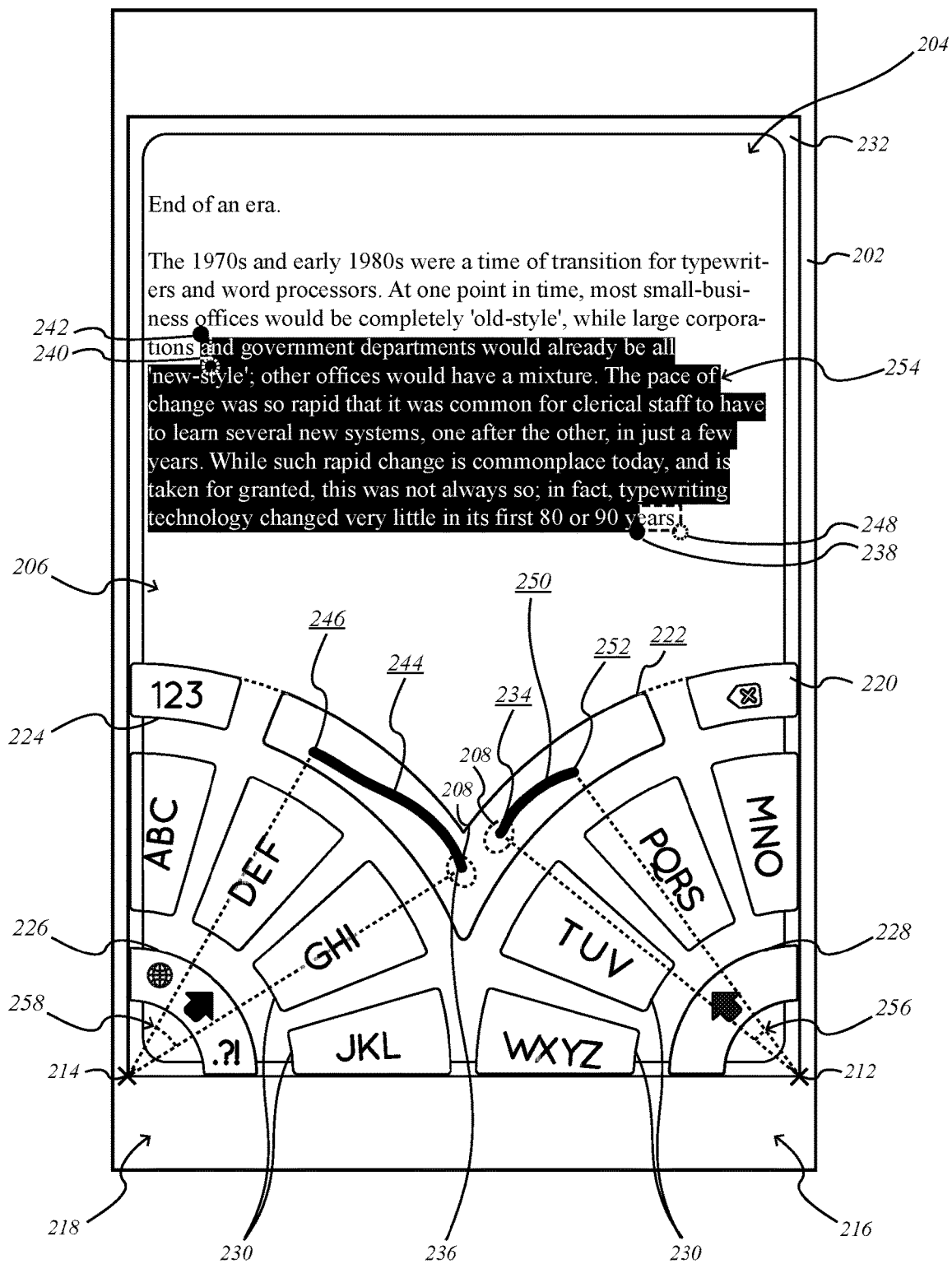
FIG. 2 is a face side view of a device having groups of virtual ambiguous keys, in accordance with one embodiment.

FIG. 2 depicts a system 200, in accordance with one embodiment. As an option, the present system 200 may be implemented in conjunction with features from any other embodiment listed herein, such as those described with reference to the other FIGS. Of course, however, such system 200 and others presented herein may be used in various applications and/or in permutations which may or may not be specifically described in the illustrative embodiments listed herein. Further, the system 200 presented herein may be used in any desired environment.

System 200 includes a device 202. It should be noted that although the device 202 is illustrated to be a tablet device, in other approaches, the device 202 may be any type of device, e.g., such as the device prefaced elsewhere herein, e.g., see descriptions of method 100.

The device 202 includes a display 232 having a display area 204. The device 202 further includes a touch-sensitive input area 206. The touch-sensitive input area 206 may include groups of virtual ambiguous keys arranged approximately radially about at least one center point. For example, the touch-sensitive input area 206 includes a first group 216 of virtual ambiguous keys 230 arranged approximately radially about a first center point 212 and a second group 218 of virtual ambiguous keys 230 arranged approximately radially about a second center point 214.

For reference, use of the term "ambiguous" of virtual ambiguous key(s) is intended to correspond to such keys including any predetermined characters. For example, the virtual ambiguous keys may include any number (preferably at least two) of characters, e.g., letters, numbers, emojis, etc. It should be noted that such characters may be modified to include any known characters of any known language and/or type.

In another approach, the number of characters assigned to a particular virtual ambiguous key may be three or four. In other approaches, the number of characters assigned to a particular virtual ambiguous key may be two to five. For example, a virtual ambiguous key including the characters "ABC" is associated to a key identifier sequence that is associated to either "a", "b" or "c" characters. This key is also associated to characters "a", "b" and "c". In a preferred approach eight virtual ambiguous keys may include the characters: "ABC", "DEF", "GHI", "JKL", "MNO", "PQRS", "TUV", and "WXYZ". In other approaches, these associations can be of any set of characters or phrases or syllabics of any language, for example German characters or japan syllabics. In some approaches, displayed characters and the set of characters of the key identifier sequence are not the same. For example, in some languages with different accent on the vowels, a virtual ambiguous key may include the characters "ABC" but the associated set of characters and the associated set of characters of the key identifier sequence may be "a", "a", "b" and "c".

According to various approaches, the at least one center point may be located at any location on the touch-sensitive input area of the display. However, in preferred approaches, the center point is located spaced from the corner (away from the display) at about the position of the thumb joint when engaged in typing on the touch-sensitive input area. Positioning the center point spaced from the corner at about the position of the thumb joint when engaged in typing on the touch-sensitive input area allows for a user that utilizes the corners of the display when holding the display to easily select any one or more of the virtual ambiguous keys during associated touch events. For example, in response to the center point being located at about the expected position of a thumb joint, e.g., interphalangeal thumb joint, of a user when the user is engaged in typing/using the touch-sensitive input area, the groups of virtual ambiguous keys arranged approximately radially about the center point, may be contacted, e.g., during a touch event, and thereby selected by a user typing on the touch-sensitive input area.

It should be noted that the particular corners of the display at which the center points are spaced from may depend and/or be changed in response to the device (on which method 100 is being performed) rotating. For example, in one approach, in response to determining, e.g., using an accelerometer, that a device including the display has been rotated, the overall configuration of the display may also be rotated on the display, e.g., and spaced according to the change in display spacing (if any).

In the present approach, the first center point 212 may be located at about a corner of the display area 204. Moreover, the second center point 214 may be located at about a corner of the display area 204, e.g., which is preferably a different corner than the corner that the first center point 212 is located at.

It should be noted that the first and second center points 212, 214 are illustrated in FIG. 2 for purposes of an example only. This is because in various approaches the center points 212, 214 may not be visible to a user holding and/or typing on the device 202, but rather be descriptive references of points that the groups 216, 218 of virtual ambiguous keys 230 are arranged approximately radially about. Moreover, the center points 212, 214 are provided for purposes of an example in FIG. 2, and thus center points described herein should not be interpretively limited thereto. In other words, different configurations of other virtual ambiguous keys that would be apparent to one skilled in the art upon reading the descriptions may change the location of such center points. However, it should be noted that in some approaches, at least one of the center points 212, 214 may preferably located spaced from a corner of the device 202 and/or display area 204 at about the position of the thumb joint of a user when engaged in typing and/or performing gestures on the touch-sensitive input area 206 of the device 202.

In the present approach, although the touch-sensitive input area 206 includes thirteen virtual ambiguous keys 230 in total, the total number of virtual ambiguous keys 230 displayed may change at any time, e.g., based on a resizing event occurring, based on an updating of characters of the virtual ambiguous keys 230, based on an enabling and/or disabling of the text selector mode, etc.

It should be noted that the touch-sensitive input area 206 may reside on a portion of the device, or in some approaches, the entire device. For example, in some approaches, the device may include the touch-sensitive input area 206 and the system may include a separate display, as will be described in other embodiments and/or approaches elsewhere herein, e.g., see FIGS. 3-4.

Each of the virtual ambiguous keys 230 may include at least one character. However some of the virtual ambiguous keys designated for particular functions may not include any characters. For example, in various approaches, some virtual ambiguous keys 230 may correspond to particular functions. For example, the touch-sensitive input area 206 of the present approach includes a delete virtual ambiguous key 220, a virtual ambiguous key 222 that may be used for any one or more of, e.g., a space function, a select displayed characters, cursor adjustment and/or facilitating selection indicator functions (as will soon be described below), etc., one or more virtual ambiguous keys (224, 226) that may be used for updating characters and/or type(s) of characters of one or more virtual ambiguous keys of at least one of the groups 216, 218, initiating a shift function (virtual ambiguous key 228), initiating a control function, etc. Accordingly, for descriptive purposes, it should be noted that while such specific function keys were originally referenced as "virtual ambiguous keys 230," the keys with specific functions are numbered in FIG. 2 with specific numbers for descriptive purposes, e.g., specifically referencing such keys.

It should be noted that according to various approaches, one or both of the groups 216, 218 of virtual ambiguous keys 230 may be resized.

In such an updating of size, the starting location of a resizing gesture may be anchored to a bottom corner edge of the touch-sensitive input area 206. In some approaches, when the resized size of the groups 216, 218 of virtual ambiguous keys 230 are big enough, some virtual ambiguous keys 230 may overlap. For example, the virtual ambiguous key 222 may include what was previously two separate keys. In some approaches, in response to such overlapping, one or more virtual ambiguous keys may disappear, or at least portions thereof. Of course the functionalities of the virtual ambiguous keys 230 that disappear may be transitioned to other virtual ambiguous keys 230. In other embodiments, the overlapping virtual ambiguous keys 230 may be partially or entirely merged.

With continued reference to FIG. 2, system 200 includes a first detected touch event 234 and a second detected touch event 236. In response to detecting the first touch event 234, a first cursor (corresponding to the detected first touch event 234) may be at least temporarily anchored at the current (initial) output location 238 thereof on the display area 204. In one approach, the first cursor may be at least temporarily anchored at the current (the output location that the first cursor is output at when the first touch event 234 is detected) or initial output location 238 thereof on the display area 204 in response to determining that the first touch event 234 corresponds to the command to anchor the first cursor. Moreover, a second cursor (corresponding to the detected second touch event 236) may be output on the display area 204, e.g., in response to detecting the second touch event 236. It should be noted that although the second cursor is preferably output to the same output location 238 as the first cursor on the display area 204, however in the present example of FIG. 2, the second cursor is shown to be output at an initial output location 240 on the display area 204.

FIG. 2 includes a selection indicator 254 that is output on a portion of the display area 204 between the first cursor and the second cursor, e.g., initially between the initial output location 240 of the second cursor and the initial output location 238 of the first cursor. In the current approach, the selection indicator 254 includes a highlighting of the portion of the display area 204 between the first cursor and the second cursor, although as described elsewhere herein, the selection indicator may include any one or more types of visual indicators. Of course, an updated selection indicator may be output on a portion of the display area 204 between the first cursor and the second cursor whenever the locations of such cursors are updated on the display area 204, as will now be described below.

Moreover, the second cursor is shown output at a subsequent second output location 242 on the display area 204 in response to detecting that a detected touch of the second touch event 236 departs from a starting location of the second touch event (the starting location is preferably at the location that the second touch event was initially detected). For example, a text selector gesture 244 illustrates the path that the detected touch of the second touch event 236 takes between the starting location and an ending location 246.

According to various approaches, in response to detecting the first touch event 234 and/or the second touch event 236 one or more touch event borders 208 may be output to the location(s) on the display 232 (at the touch-sensitive input area 206) at which the first touch event 234 and/or the second touch event 236 were initially detected. The touch event borders 208 may be used for, e.g., preventing accidental changing of one or more of the cursors, providing easier and more convenient usability of the virtual ambiguous keys, clarifying optional functionality boundaries of the virtual ambiguous keys, etc.

Moreover the touch event borders 208 may visually indicate, e.g., for a user, a distance from the detected touch event after which the output location of the corresponding cursor on the display area 204 will be changed, in response to the detected touch of the touch event departing from a starting location of the touch event.

Referring again to the first touch event 234, the first cursor is shown output at a subsequent second output location 248 on the display area 204 in response to detecting that a detected touch of the first touch event 234 departs from a starting location of the first touch event 234 (the starting location is preferably at the location that the first touch event 234 was initially detected). For example, a text selector gesture 250 illustrates the path that the detected touch of the first touch event 234 takes between the starting location and an ending location 252.

Accordingly, the selection indicator 254 that was initially output on the display area 204 between the initial output location 240 of the second cursor and the initial output location 238 of the first cursor may be updated in accordance with the updated cursor locations, e.g., second output location 248 and second output location 242.

According to various approaches, one or more of the gestures may transition approximately circumferentially about a center point from the starting location to the ending location. For example, the text selector gesture 250 is shown in the example of FIG. 2 to transition approximately circumferentially about the center point 212, thereby establishing a circumferential angular movement with respect to a reference angle 256, from the starting location of the first touch event 234 to the ending location 252. Moreover, the text selector gesture 244 is shown in the example of FIG. 2 to transition approximately circumferentially about the center point 214, thereby establishing a circumferential angular movement with respect to a reference angle 258, from the starting location of the second touch event 236 to the ending location 246.

It should be noted that a text selector gesture (not shown) that transitions in an opposite circumferential direction as the text selector gesture 244 may result in the output location of the second cursor may be changed in an about an opposite direction as a direction that the second cursor is changed as a result of the text selector gesture 244. Accordingly, in one approach, the location of second cursor may eventually pass the location of the first cursor, and/or the location of first cursor may eventually pass the location of the second cursor on the display area.

Moreover, it should be noted that in some approaches, the layout one or more of the virtual ambiguous keys 230 may facilitate streamlined typing for a user that is typing using his/her thumbs. For example, in one approach, any one or more of the virtual ambiguous keys 230 may be are arranged approximately circumferentially about at least one center point.

Accordingly, as illustrated in FIG. 2, in one approach, the starting location of the second touch event 236 may reside on a virtual ambiguous key on the touch-sensitive input area 206, where the virtual ambiguous key extends approximately circumferentially about a first center point, e.g., the virtual ambiguous key 222 extends approximately circumferentially about the center point 214. Moreover, the starting location of the first touch event may reside on the virtual ambiguous key on the touch-sensitive input area 206, where the virtual ambiguous key also extends approximately circumferentially about a second center point, e.g., the virtual ambiguous key 222 also extends approximately circumferentially about the center point 212.

It should be noted that because one or more of the virtual ambiguous keys 230 extend approximately circumferentially about at least one center point, text selection gestures also extend approximately circumferentially about at least one center point may easily be performed on such virtual ambiguous keys 230. There are numerous benefits enabled as a result detecting such circumferential text selection gestures. For example, because the at least one center point is located spaced from the corner of the display (away from the display) at about the position of the thumb joint when engaged in typing on the touch-sensitive input area 206), a user will not have to adjust his/her grip of the device and/or strain to, e.g., in order to change cursor locations on a display, in order to select text and/or a portion of a display area, etc. Accordingly, streamlined typing on keyboards such as the virtual keyboard displayed on the touch-sensitive input area 206 will be enabled. Accordingly, users will not have to reach for a mouse or adjust handling positions of a device (as users are on conventional typing devices) in order to perform such tasks. Moreover, additional computer components, e.g., such as a computer mouse, that were otherwise used for such tasks may be eliminated. In addition to the streamlined related benefits, these reductions in computer components will result in, e.g., a conservation of materials, a reduction of waste, a reduction in costs associated with using computer devices, etc.

Of course, a reduction in computer components will moreover result in less component processes being processed by a computer, e.g., specifically by a controller of a computer in some approaches. Accordingly, the processing potential of computers will also improve and/or be preserved as a direct result of various embodiments described herein.

Moreover, it should be considered that people who undergo learning how to operate computers, e.g., such as learning how to adjust cursor position on a display and/or select text on a display are often youth, such as children in schools. Of course, such youth often are responsible for learning such skills while in school. However, students often are also responsible for learning mathematics classes, history classes, science classes, etc. This can be very burdensome to balance all at the same time. Accordingly, using various embodiments and/or approaches described herein, youth will be able to learn to operate an electronic device more efficiently than is otherwise available using conventional computer systems. This will afford such youth more time to study other important subjects, and furthermore, help such youth to, at a young age, develop the skill of computer efficiency, more quickly than would otherwise be available using conventional computer keyboard formats, which as described herein, often require users to reach for a computer mouse or adjust their hand placement on a device during use of the device.

Figure 3:
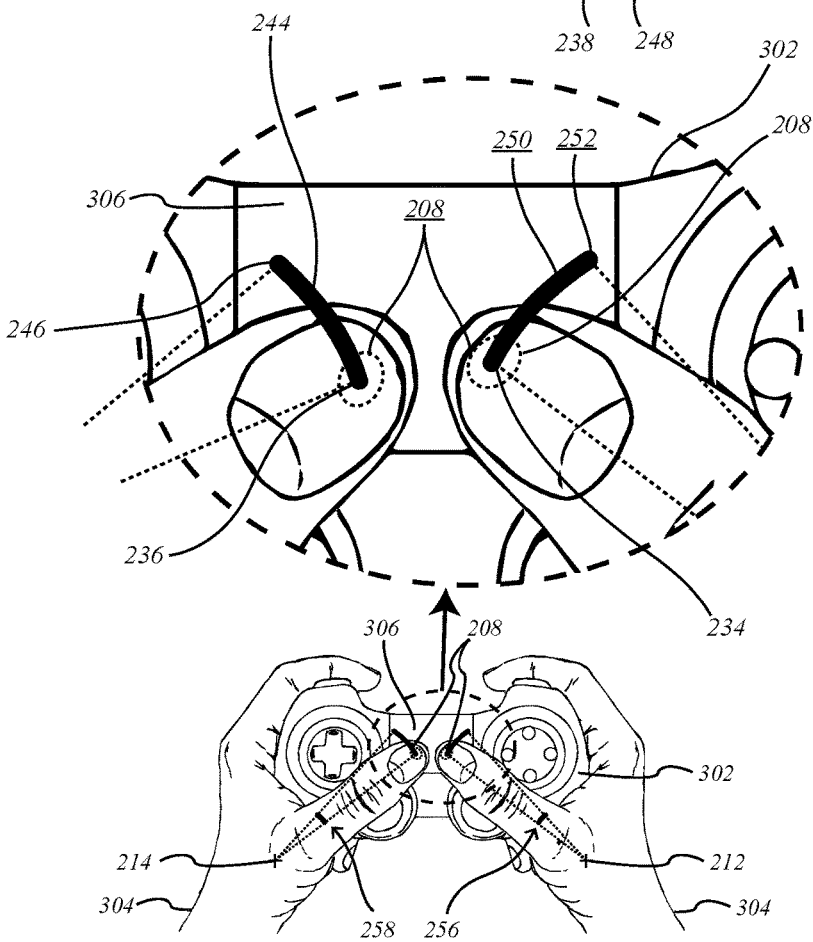
FIG. 3 is a face side view of a display and a user's hands holding a device having a touch-sensitive area on a touchpad, in accordance with one embodiment.
Figure 4:
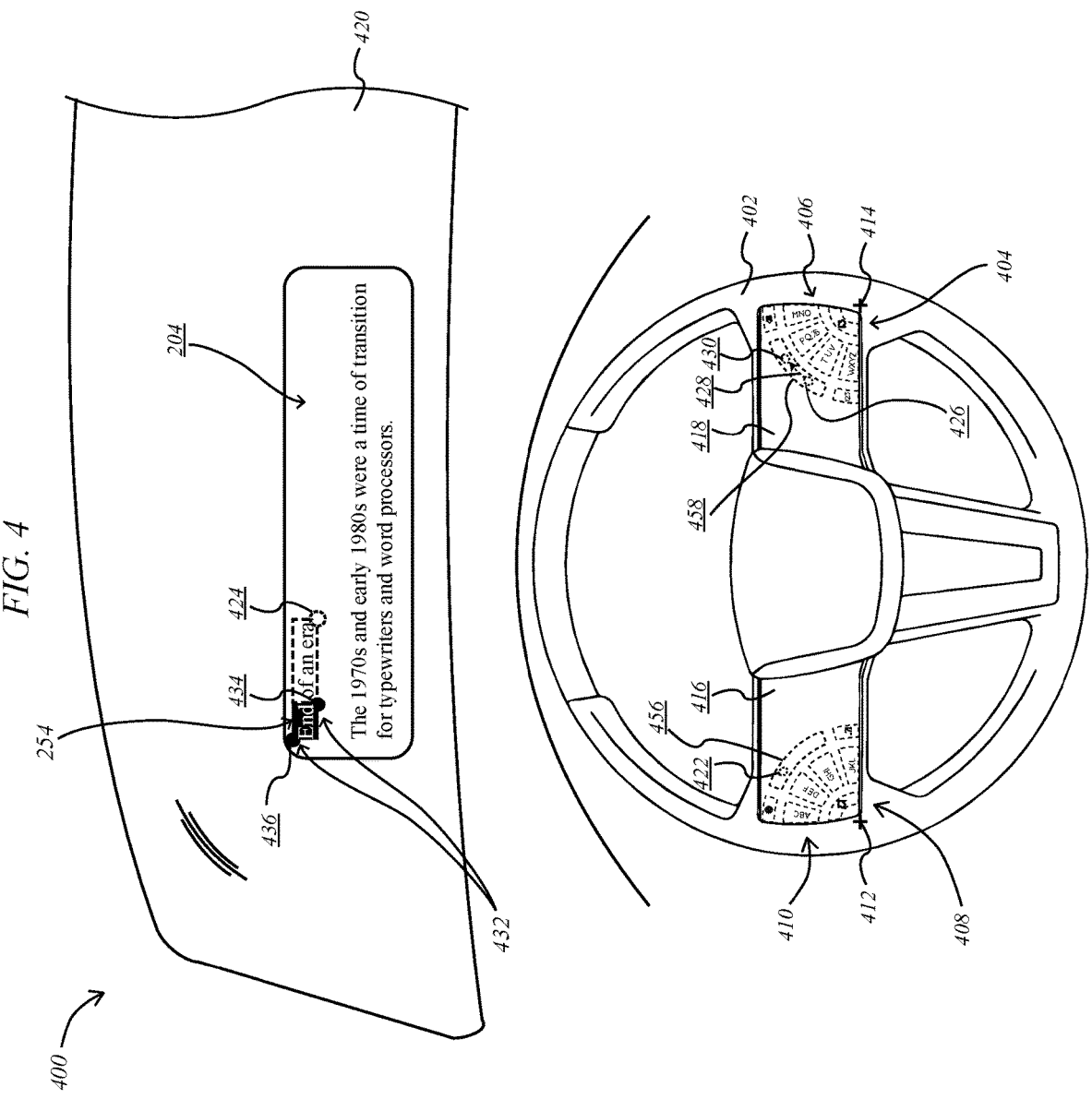
FIG. 4 is a face side view of a display on a vehicle windshield, and a steering wheel device having a plurality of touch-sensitive areas, in accordance with one embodiment.

FIG. 3-4 depicts systems 300-400, in accordance with various embodiments. As an option, the present systems 300-400 may be implemented in conjunction with features from any other embodiment listed herein, such as those described with reference to the other FIGS. Of course, however, such systems 300-400 and others presented herein may be used in various applications and/or in permutations which may or may not be specifically described in the illustrative embodiments listed herein. Further, the systems 300-400 presented herein may be used in any desired environment.

It should be noted that any one or more components of the systems 200-400 may share common numberings, e.g., for similar functionalities and/or displayed components thereof.

Referring first to FIG. 3, system 300 includes a game controller device 302 held by a user's hands 304. Moreover, system 300 includes a display area 204 that is not physically connected to the game controller device 302. In preferred approaches, the display area 204 may be of a display 310 of a second device 308 that is wirelessly connected to the game controller device 302.

According to various approaches, a starting location of the first touch event 234 and/or a starting location of the second touch event 236 may reside on a keypad 306, e.g., of the game controller device 302.

It should be noted that the game controller device 302 and/or the second device 308, or any components thereof, may not be ordinary conventional devices. Instead, the game controller device 302 and/or the second device 308, or any components thereof, may be modified and/or new devices that are configured to perform various operations and/or decisions of various embodiments and/or approaches herein, e.g., such as method 100.

Moreover, although the keypad 306 is not shown to include any output virtual ambiguous keys, the keypad 306 is preferably configured to be used in detecting any one or more touch events, e.g., such as the first touch event of method 100, the second touch event of method 100, a third touch event, etc. Moreover, in other approaches, the keypad 306 may additionally and/or alternatively include at least one virtual ambiguous key displayed thereon.

Referring now to FIG. 4, system 400 includes a device 402. In the present approach, the device 402 is a steering wheel of a vehicle, although in other approaches, the device 402 may be any type of device that is often held by at least one hand of a user while being used, e.g., a cellular phone, a display control, etc.

The device 402 includes a first group 408 of virtual ambiguous keys 410 arranged approximately radially about a first center point 412. The device 402 further includes a second group 404 of virtual ambiguous keys 406 arranged approximately radially about a second center point 414. The first group 408 of virtual ambiguous keys 410 reside on a first touch-sensitive input area 416 of the device 402. Moreover, the second group 404 of virtual ambiguous keys 406 reside on a second touch-sensitive input area 418 of the device 402.

System 400 further includes a display 420, which in the present approach is a windshield of the vehicle. The display 420 has a display area 204.

According to one approach, system 400 may include a projector for displaying an output as shown in FIG. 4 onto the display area 204. According to various other approaches, the display area 204 of the display 420 may additionally and/or alternatively be selectively transparent. For example, the display area 204 of the display 420 may display an output while the vehicle is not in motion and/or while the vehicle is being driven autonomously. Moreover, when the vehicle is not being driven autonomously and/or at any other time, the display area 204 of the display 420 may be transparent and allow viewing there through. In yet another approach, at any time the display area 204 of the display 420 may be semi-transparent, e.g., allow viewing of an output on the display area 204 of the display 420 and allow viewing there through.

For purposes of an example, reference will now be made to the various output selections on the display area 204 of the display 420 and detected touch events on the touch-sensitive input areas 416, 418.

In the present approach, a first touch event 422 is detected on the touch-sensitive input area 416 of the device 402. Similar to as described elsewhere herein, e.g., see decision 106, the first touch event 422 may be determined to correspond to a command to anchor a first cursor 424 at a current location of the first cursor 424 on the display area 204 coupled to the touch-sensitive input area 416. It may be assumed here that the first touch event 422 has been determined to correspond to a command to anchor the first cursor 424 at the current location of the first cursor 424 on the display area 204, and thus the first cursor 424 is shown anchored at the current location of the first cursor 424 on the display area 204.

Moreover, a second touch event 426 is detected on a different touch-sensitive input area 418 of the device 402. The second touch event 426 includes a gesture 428 with a starting location (location at which the second touch event 426 is detected) and an ending location 430.

Accordingly, a second cursor 432 may be output on the display area 204. In preferred approaches, the second cursor 432 is output at the same location as the first cursor 424. However, in other approaches, the second cursor 432 may be output to any location on the display area 204.

It should be noted that in the present example, the second cursor is shown changed from a first location 434 on the display area 204 to a second location 436 on the display area 204 in response to detecting that a detected touch of the second touch event 426 departs from the starting location of the second touch event (departs from the location on the touch-sensitive input area at which the second touch event was initially detected), e.g., see gesture 428.

A selection indicator 254 is shown output on a portion of the display area between the first cursor 424 and the second cursor 432 (where the second cursor 432 is at the first location 434 and/or the second location 436 in the present example).

It should be noted that in the present approach, the starting location of the first touch event 422 resides on a first virtual ambiguous key 456 on the first touch-sensitive input area 416, where the first virtual ambiguous key 456 extends approximately circumferentially about the first center point 412. Moreover, the starting location of the second touch event 426 resides on a second virtual ambiguous key 458 on the second touch-sensitive input area 418, where the second virtual ambiguous key 458 extends approximately circumferentially about the second center point 414. In one approach, the first virtual ambiguous key 456 and the second virtual ambiguous key 458 may reside on a common touch-sensitive input area.

Moreover, it should be noted that the virtual ambiguous keys 406, 410 in FIG. 4 are dashed to illustrate that in some approaches, some or all of the virtual ambiguous keys 406, 410 may be at least temporarily not visually displayed on the device 402. This may be for eye-free touch events, e.g., such as when the user is familiar with and has memorized the layout of the virtual ambiguous keys 406, 410 and/or the approximate locations of such keys 406, 410 on the touch-sensitive input areas 416, 418.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   detecting a first touch event on a touch-sensitive input area of a device;
   determining that the first touch event corresponds to a command to anchor a first cursor at a current location of the first cursor on a display area coupled to the touch-sensitive input area;
   at least temporarily anchoring the first cursor at the current location thereof on the display area in response to determining that the first touch event corresponds to the command to anchor the first cursor;
   changing an output location of the first cursor on the display area in response to detecting that a detected touch of the first touch event departs from a first starting location of the first touch event;
   detecting a second touch event on a different portion of the touch-sensitive input area of the device;
   outputting a second cursor on the display area at the current location of the first cursor in response to the second touch event;
   changing the output location of the second cursor on the display area in response to detecting that a detected touch of the second touch event departs from a second starting location of the second touch event; and
   outputting a selection indicator on a portion of the display area between the first cursor and the second cursor.

2. A method as recited in claim 1,
   wherein detecting the second touch event includes determining an ending location of a gesture extending between the second starting location and the ending location.

3. A method as recited in claim 2, wherein a degree that the output location of the second cursor changes on the display area is based at least in part on a time to traverse from the second starting location to the ending location of the gesture.

4. A method as recited in claim 2, wherein the second touch event includes a series of gestures.

5. A method as recited in claim 2, wherein the gesture transitions approximately circumferentially about a center point from the second starting location to the ending location.

6. A method as recited in claim 1, wherein the second starting location of the second touch event resides on a virtual ambiguous key on the touch-sensitive input area, wherein the virtual ambiguous key extends approximately circumferentially about a first center point.

7. A method as recited in claim 6, wherein the first center point is located at about a corner of the display area.

8. A method as recited in claim 6, wherein the first starting location of the first touch event resides on a second virtual ambiguous key on the touch-sensitive input area, wherein the second virtual ambiguous key extends approximately circumferentially about a second center point.

9. A method as recited in claim 6, wherein the first starting location of the first touch event resides on the virtual ambiguous key on the touch-sensitive input area, wherein the virtual ambiguous key also extends approximately circumferentially about a second center point.

10. A method as recited in claim 1, wherein the first starting location of the first touch event resides on a keypad, wherein the display area is not physically connected to the device.

11. A method as recited in claim 1,
    wherein detecting the second touch event includes determining an ending location of a gesture extending between the second starting location and the ending location,
    wherein a degree that the output location of the second cursor changes on the display area is based at least in part on a time to traverse from the second starting location to the ending location of the gesture,
    wherein the second touch event includes a series of gestures,
    wherein the gesture transitions approximately circumferentially about a center point from the starting location to the ending location,
    wherein the second starting location of the second touch event resides on a virtual ambiguous key on the touch-sensitive input area, wherein the virtual ambiguous key extends approximately circumferentially about a first center point,
    wherein the first center point is located at about a corner of the display area,
    wherein a first starting location of the first touch event resides on a second virtual ambiguous key on the touch-sensitive input area,
    wherein the second virtual ambiguous key extends approximately circumferentially about a second center point.

12. A computer program product, comprising:
    a non-transitory computer readable storage medium having stored thereon computer readable program instructions configured to cause a processor of a computer system to:
    detect a first touch event on a touch-sensitive input area of a device;
    determine that the first touch event corresponds to a command to anchor a first cursor at a current location of the first cursor on a display area coupled to the touch-sensitive input area;
    at least temporarily anchor the first cursor at the current location thereof on the display area in response to determining that the first touch event corresponds to the command to anchor the first cursor;
    change an output location of the first cursor on the display area in response to detecting that a detected touch of the first touch event departs from a first starting location of the first touch event;
    detect a second touch event on a different portion of the touch-sensitive input area of the device;
    output a second cursor on the display area at the current location of the first cursor in response to the second touch event;
    change the output location of the second cursor on the display area in response to detecting that a detected touch of the second touch event departs from a second starting location of the second touch event; and
    output a selection indicator on a portion of the display area between the first cursor and the second cursor.

13. A computer program product as recited in claim 12,
    wherein detecting the second touch event includes determining an ending location of a gesture extending between the second starting location and the ending location.

14. A computer program product as recited in claim 13, wherein a degree that the output location of the second cursor changes on the display area is based at least in part on a time to traverse from the second starting location to the ending location of the gesture.

15. A computer program product as recited in claim 13, wherein the second touch event includes a series of gestures.

16. A computer program product as recited in claim 13, wherein the gesture transitions approximately circumferentially about a center point from the second starting location to the ending location.

17. A computer program product as recited in claim 12, wherein the second starting location of the second touch event resides on a virtual ambiguous key on the touch-sensitive input area, wherein the virtual ambiguous key extends approximately circumferentially about a first center point.

18. A computer program product as recited in claim 17, wherein the first starting location of the first touch event resides on a second virtual ambiguous key on the touch-sensitive input area, wherein the second virtual ambiguous key extends approximately circumferentially about a second center point.

19. A computer program product as recited in claim 17, wherein the first starting location of the first touch event resides on the virtual ambiguous key on the touch-sensitive input area, wherein the virtual ambiguous key also extends approximately circumferentially about a second center point.

20. A computer program product as recited in claim 12,
wherein detecting the second touch event includes determining an ending location of a gesture extending between the second starting location and the ending location,
wherein a degree that the output location of the second cursor changes on the display area is based at least in part on a time to traverse from the second starting location to the ending location of the gesture,
wherein the second touch event includes a series of gestures,
wherein the gesture transitions approximately circumferentially about a center point from the starting location to the ending location,
wherein the second starting location of the second touch event resides on a virtual ambiguous key on the touch-sensitive input area, wherein the virtual ambiguous key extends approximately circumferentially about a first center point,
wherein a first starting location of the first touch event resides on a second virtual ambiguous key on the touch-sensitive input area,
wherein the second virtual ambiguous key extends approximately circumferentially about a second center point.

* * * * *